United States Patent
Kruayatidee et al.

(10) Patent No.: US 10,872,133 B1
(45) Date of Patent: Dec. 22, 2020

(54) SOFTWARE APPLICATION ACTIVATION USING A PICTURE-BASED ACTIVATION KEY

(71) Applicant: SYMANTEC CORPORATION, Mountain View, CA (US)

(72) Inventors: Somard Kruayatidee, Stevenson Ranch, CA (US); Jonathon Salehpour, Upland, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 213 days.

(21) Appl. No.: 16/011,369

(22) Filed: Jun. 18, 2018

(51) Int. Cl.
| H04L 29/06 | (2006.01) |
| G06F 21/12 | (2013.01) |
| G06F 21/36 | (2013.01) |
| G06F 21/62 | (2013.01) |

(52) U.S. Cl.
CPC ............. *G06F 21/12* (2013.01); *G06F 21/36* (2013.01); *G06F 21/629* (2013.01); *G06F 2221/072* (2013.01)

(58) Field of Classification Search
CPC ......... G06F 21/10; G06F 21/105; G06F 21/12
See application file for complete search history.

(56) References Cited

U.S. PATENT DOCUMENTS

| 8,914,767 | B2 | 12/2014 | Savant et al. | |
| 9,699,299 | B1* | 7/2017 | Pereira | G06Q 30/0257 |
| 10,203,968 | B1* | 2/2019 | Lawson | G06F 9/44521 |
| 2004/0215972 | A1* | 10/2004 | Sung | H04L 63/1408 726/23 |
| 2006/0182133 | A1* | 8/2006 | Choumaru | H04L 45/745 370/401 |
| 2011/0283115 | A1* | 11/2011 | Junod | H04L 9/0631 713/190 |
| 2013/0239104 | A1* | 9/2013 | Savant | G06F 21/121 717/178 |
| 2013/0259228 | A1* | 10/2013 | Ren | H04L 63/123 380/200 |
| 2014/0156990 | A1* | 6/2014 | Dare | H04L 63/0823 713/156 |
| 2014/0325239 | A1* | 10/2014 | Ghose | G06F 9/3851 713/190 |

(Continued)

FOREIGN PATENT DOCUMENTS

WO  WO-2015114460 A2 *  8/2015  ........... G06Q 20/322

*Primary Examiner* — Taghi T Arani
*Assistant Examiner* — Lin Chang
(74) *Attorney, Agent, or Firm* — Maschoff Brennan (57) ABSTRACT

Software activation using a picture-based activation key. In some embodiments, a method may include presenting, on a display of the network device, a request for a user to enter a picture-based activation key in order to activate a software application on the network device. The method may also include receiving, at the network device, the picture-based activation key that includes pictures. The method may also include confirming, at the network device, that the received picture-based activation key is a valid picture-based activation key for the software application. The method may further include, in response to confirming that the received picture-based activation key is a valid picture-based activation key for the software application, activating the software application on the network device.

18 Claims, 6 Drawing Sheets

(56) References Cited

U.S. PATENT DOCUMENTS

| | | | | |
|---|---|---|---|---|
| 2015/0127438 A1* | 5/2015 | Wedderburn | ......... | H04W 4/029 |
| | | | | 705/14.16 |
| 2015/0186645 A1* | 7/2015 | Aziz | ................... | H04L 63/1433 |
| | | | | 726/23 |
| 2015/0207706 A1* | 7/2015 | Li | ........................... | H04L 67/02 |
| | | | | 709/224 |
| 2017/0046211 A1* | 2/2017 | Jayawardena | ...... | G06F 9/45512 |
| 2018/0310046 A1* | 10/2018 | Cullen | ................. | H04N 21/812 |

\* cited by examiner

| Code | Browser | OS-1 | OS-2 | OS-3 | OS-4 | OS-5 | OS-6 | OS-7 | OS-8 | CLDR Short Name |
|---|---|---|---|---|---|---|---|---|---|---|
| U+1F600 | 😀 | 😀 | 😀 | 😀 | 😀 | 😀 | 😀 | 😀 | ☐ | Grinning Face |
| U+1F609 | 😉 | 😉 | 😉 | 😉 | 😉 | 😉 | 😉 | 😉 | ☐ | Winking Face |

SOFTWARE APPLICATION ACTIVATION USING A PICTURE-BASED ACTIVATION KEY

BACKGROUND

Many software applications require activation prior to allowing a user to have access to some or all of the features of the software applications. Activation of a software application often requires a user to manually enter a relatively long activation key of alphanumeric characters, such as an activation key of 25 alphanumeric characters.

Unfortunately, however, requiring a user to type a 25-character activation key on a keyboard in order to activate a software application can be tedious and error prone for the user. This tedious and error prone process may be exacerbated when a user is required to type a 25-character activation key on a computing device without a traditional keyboard, such as a smartphone with a touchscreen that presents only a relatively small graphical user interface (GUI) virtual keyboard to a user. Therefore, requiring a user to enter a 25-character activation key in order to activate a software application often results in the user being unsuccessful and frustrated.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for software activation using a picture-based activation key may be performed, at least in part, by a network device including one or more processors. The method may include presenting, on a display of the network device, a request for a user to enter a picture-based activation key in order to activate a software application on the network device. The method may also include receiving, at the network device, the picture-based activation key that includes pictures. The method may also include confirming, at the network device, that the received picture-based activation key is a valid picture-based activation key for the software application. The method may further include, in response to confirming that the received picture-based activation key is a valid picture-based activation key for the software application, activating the software application on the network device.

In some embodiments, the method may further include receiving, at the network device, renderings of the pictures of the picture-based activation key that are specific to an operating system of the network device.

In some embodiments, the picture-based activation key may include numeric characters in addition to the pictures of the picture-based activation key. In these embodiments, each of the pictures of the picture-based activation key may be paired with one of the numeric characters of the picture-based activation key.

In some embodiments, the picture-based activation key may include alphabetic characters in addition to the pictures of the picture-based activation key. In these embodiments, each of the pictures of the picture-based activation key is paired with one of the alphabetic characters of the picture-based activation key.

In some embodiments, the pictures of the picture-based activation key may be Unicode emoji characters. In these embodiments, the method may further include receiving, at the network device, renderings of the Unicode emoji characters of the emoji-based activation key that are specific to an operating system of the network device. Further, in these embodiments, the method may further include determining the operating system of the network device. Also, in these embodiments, the Unicode emoji characters of the emoji-based activation key may each be paired with an alphanumeric character. Further, in these embodiments, the paired alphanumeric characters may be received, at the network device, along with the renderings of the Unicode emoji characters of the emoji-based activation key that are specific to the operating system of the network device.

Also, in some embodiments, one or more non-transitory computer-readable media may store one or more instructions that, when executed, cause one or more processors to perform a method for software activation using a picture-based or emoji-based activation key.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Conventional methods for activating a software application often require a user to manually enter a relatively long activation key of alphanumeric characters, such as an activation key of 25 alphanumeric characters. Unfortunately, however, requiring a user to type a 25-character alphanumeric activation key on a keyboard in order to activate a software application can be tedious and error prone for the user, which is exacerbated when a user is using a non-traditional keyboard, such as a GUI virtual keyboard on a smartphone touchscreen. Therefore, requiring a user to enter a 25-character activation key in order to activate a software application often results in the user being unsuccessful and frustrated.

Embodiments disclosed herein may alleviate these and/or other problems. For example, embodiments disclosed herein may enable software activation using a picture-based activation key. In some embodiments, software activation may be achieved by allowing a user to enter a picture-based activation key that includes pictures, such as Unicode emoji characters, instead of an alphanumeric activation key that consists entirely of alphanumeric characters. In some embodiments, the picture-based activation key may be shorter and/or easier for a user to enter than a conventional activation key. Therefore, the embodiments disclosed herein may enable a user to be more successful and less frustrated when entering an activation key, and the entering of the activation key may also be more enjoyable for the user.

Figure 1:
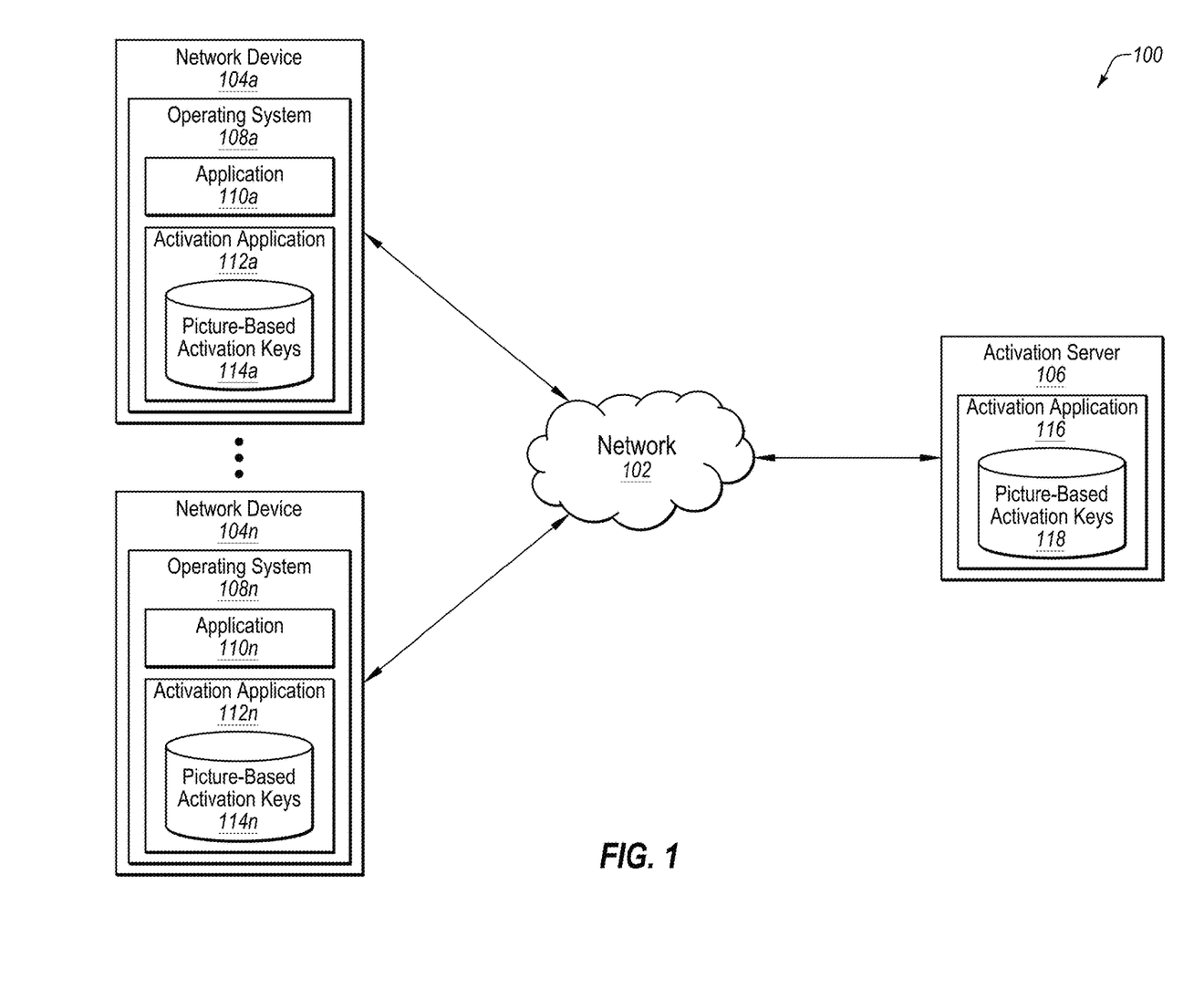
FIG. 1 illustrates an example system configured for software activation using a picture-based activation key.

Turning to the figures, FIG. 1 illustrates an example system 100 configured for software activation using a picture-based activation key. The system 100 may include a network 102, network devices 104a-104n, and an activation server 106.

In some embodiments, the network 102 may be configured to communicatively couple the network devices 104a-104n to one another as well as to the activation server 106 and other network systems and devices. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network. These communication protocols may include Bluetooth protocols, WiFi protocols, WiMax protocols, LiFi protocols, BLE protocols, infrared protocols, and/or the like In some embodiments, each of the network devices 104a-104n may be any computer system capable of communicating over the network 102, examples of which are disclosed herein in connection with the computer system 500 of FIG. 5. In some embodiments, the network devices 104a-104n may execute operating systems 108a-108n, respectively, as well as applications 110a-110n, respectively. In some embodiments, the applications 110a-110n may be activated using a picture-based activation key, as disclosed herein in greater detail in connection with FIGS. 2A-2B, 3, and 4 herein.

Figure 4:
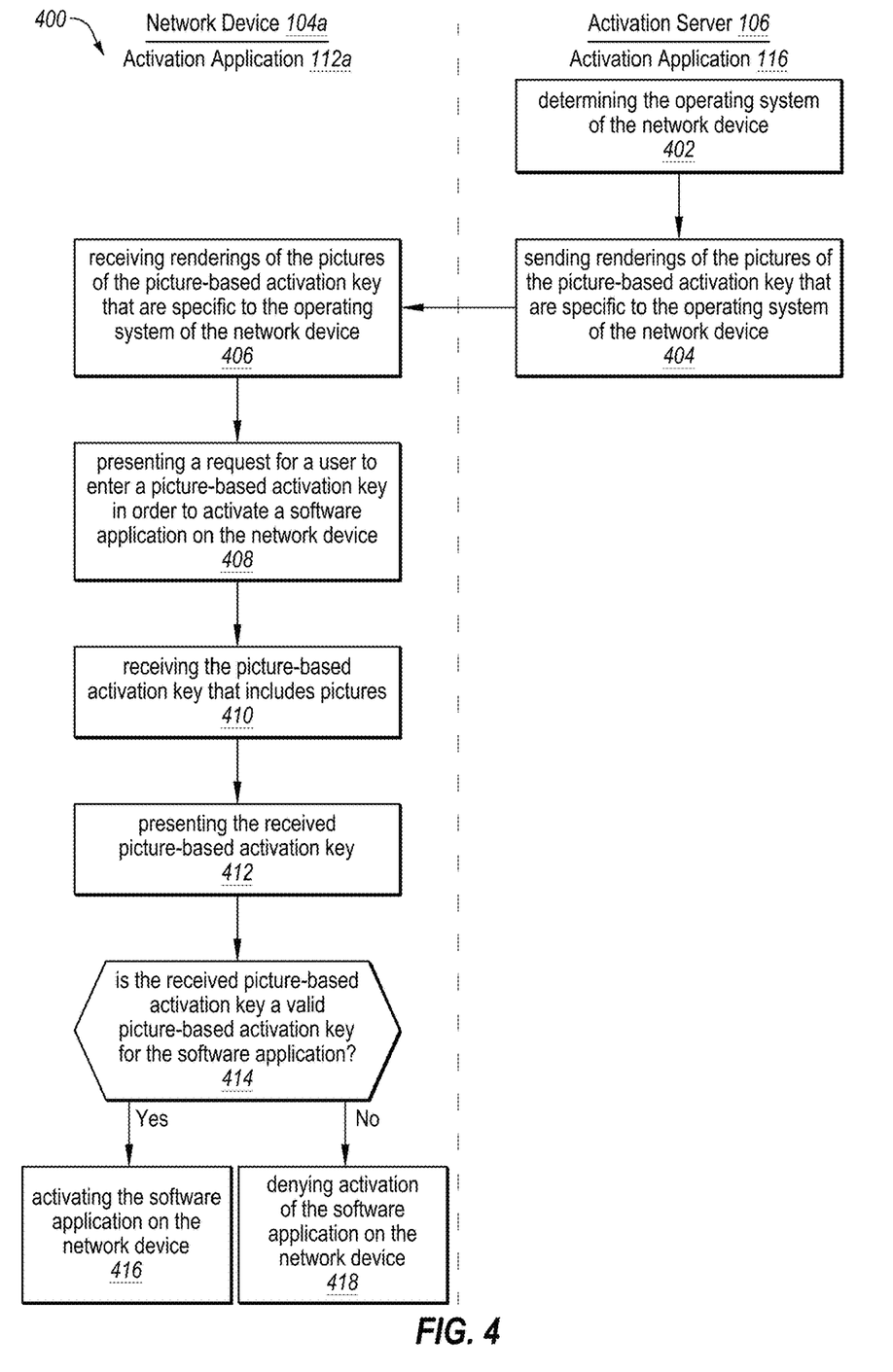
FIG. 4 is a flowchart of an example method for software activation using a picture-based activation key.
Figure 5:
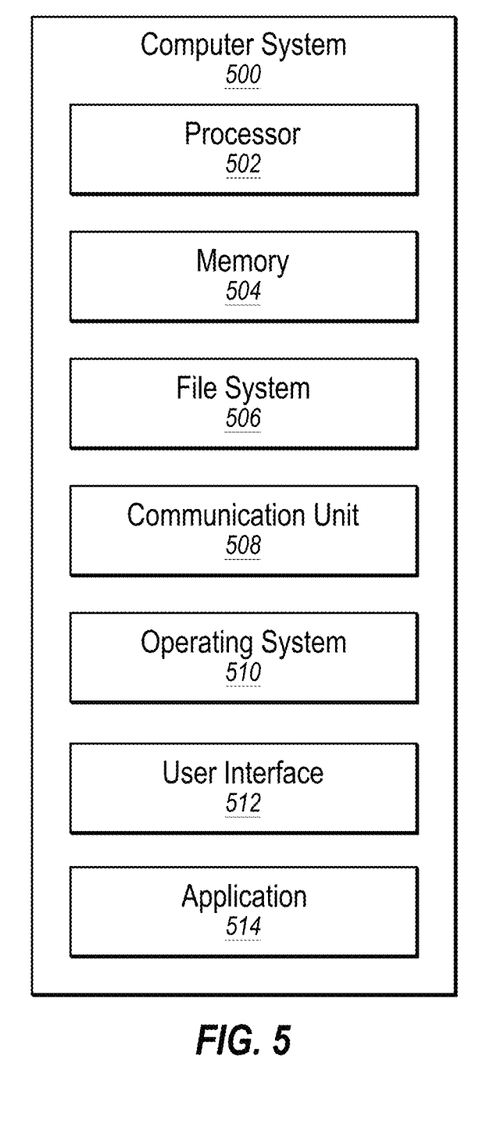
FIG. 5 illustrates an example computer system that may be employed in software activation using a picture-based activation key.

In some embodiments, the activation server 106 may be any computer system capable of communicating over the network 102 and capable of activating, or assisting in the activation of, the applications 110a-110n on the network devices 104a-104n, examples of which are disclosed herein in connection with the computer system 500 of FIG. 5. In some embodiments, the activation server 106 may execute an activation application 116 that may function in connection with similar or identical activation applications 112a-112n executing on the network devices 104a-104n. The activation applications 116 and 112a-112n may store picture-based activation keys 118 and 114a-114n, respectively. These picture-based activation keys 118 and 114a-114n may be employed to validate a picture-based activation key entered by a user during activation of the applications 110a-110n, as disclosed herein in greater detail in connection with FIGS. 2A-2B, 3, and 4 herein.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
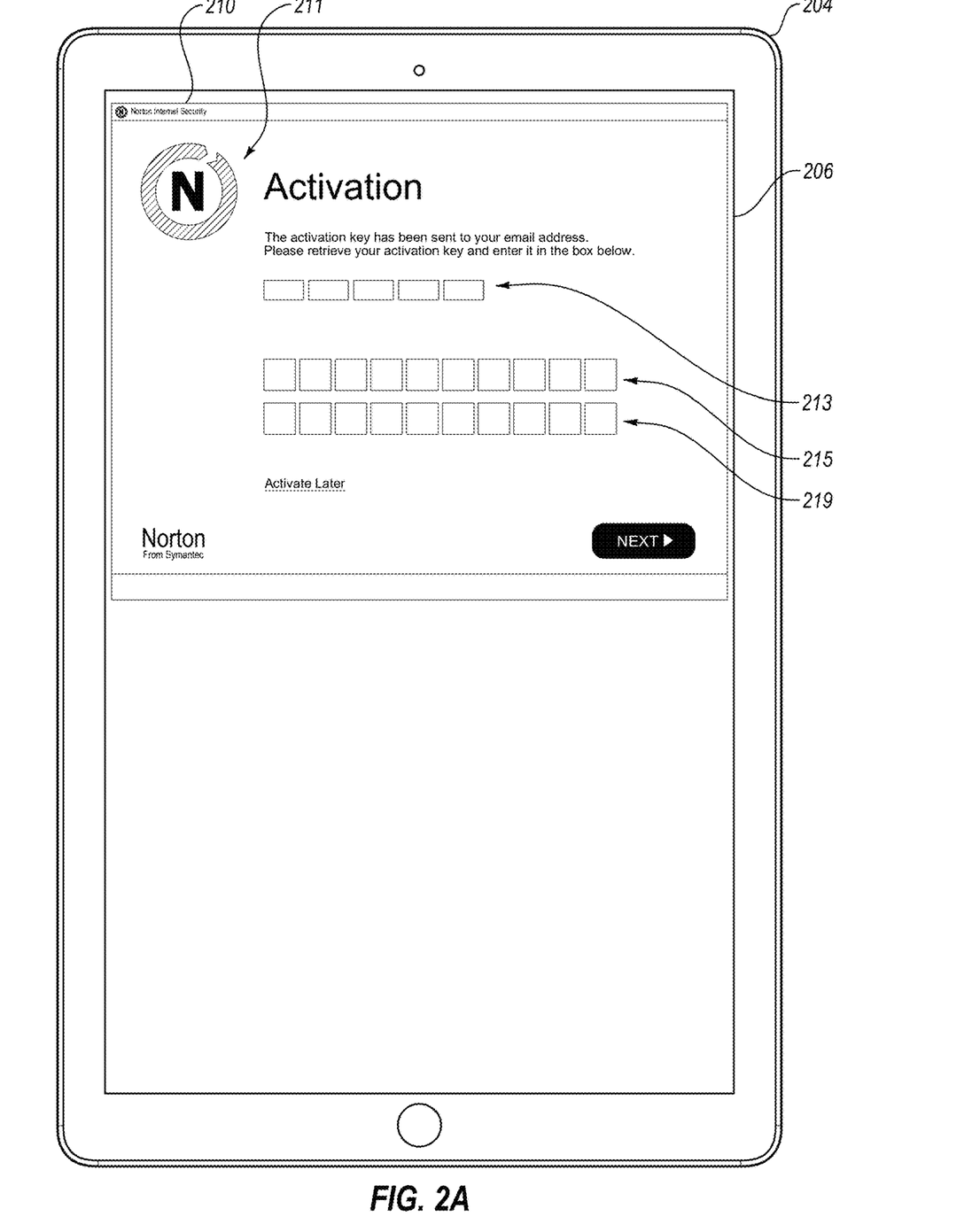
FIGS. 2A-2B illustrate an example network device configured for software activation using a picture-based activation key.
Figure 2B:
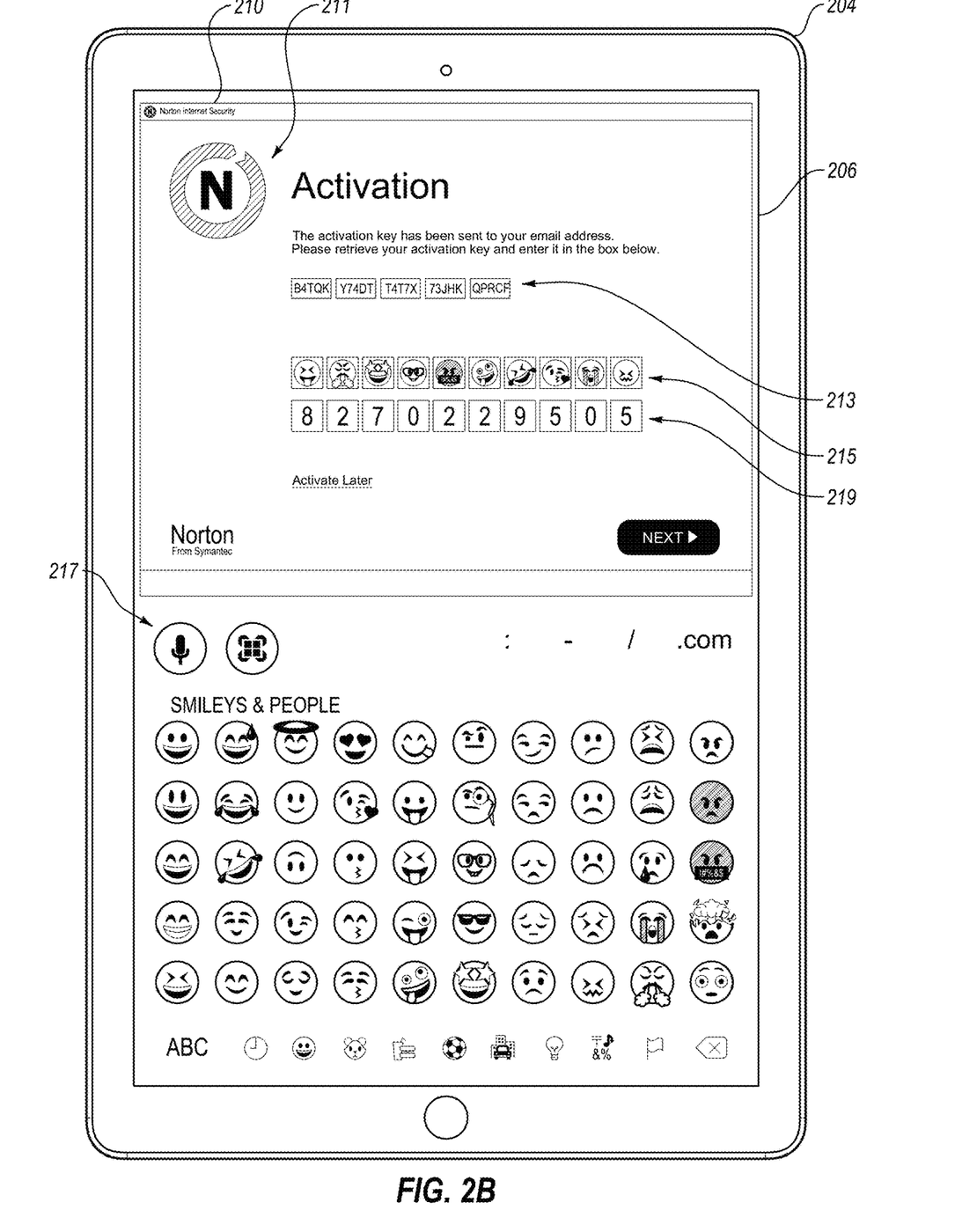

FIGS. 2A-2B illustrate an example network device configured for software activation using a picture-based activation key. In particular, FIGS. 2A-2B illustrate a smartphone 204 having a touchscreen 206. As illustrated FIGS. 2A-2B, the smartphone 204 is an Apple iPhone 6 Plus smartphone that is executing an iOS version 11.3 operating system. The smartphone 204 is also executing an application 210. As illustrated FIGS. 2A-2B, the application 210 Symantec Corporation's Norton Internet Security software application. Further, the screen of the application 210 illustrated in FIGS. 2A-2B is the activation screen 211.

Unlike conventional software activation screens that require a user to type a 25-character activation key that consists entirely of 25 alphanumeric characters, the activation screen 211 allows a user to either type a 25-character alphanumeric activation key in the fields 213 or type a 10-character picture-based activation key in the fields 215 (e.g., a length users in the U.S. are accustomed to typing due to a typical U.S. phone number being 10 characters in length). It is understood that picture-based activation keys having other lengths may also be employed, such as an 11-character picture-based activation key (e.g., a length users in China or Japan are accustomed to typing due to a typical Chinese or Japanese phone number being 11 characters in length), or other lengths such as lengths matching other typical country phone number lengths, or other lengths not matching any typical phone number length.

For example, as illustrated in FIG. 2B, a user may employ a GUI virtual keyboard 217 that is presented on the touchscreen 206 of the smartphone 204 to either type the 25-character alphanumeric activation key illustrated in the fields 213 or type the 10-character picture-based activation key illustrated in the fields 215. As disclosed in FIG. 2B, the picture characters of the 10-character picture-based activation key may be Unicode emoji characters. Because the 10-character emoji-based activation key is shorter and easier for the user to enter than the 25-character alphanumeric activation key, the activation screen 211 may enable the user to be more successful and less frustrated when entering the 10-character emoji-based activation key.

In some embodiments, each character of the 10-character picture-based activation key illustrated in the fields 215 may be paired with an alphabetic character, a numeric character, or an alphanumeric character. For example, as illustrated in FIG. 2B, a user may employ the GUI virtual keyboard 217 to type the 10-character picture-based activation key illustrated in the fields 215 as well as the 10-character numeric activation key illustrated in the fields 219. This pairing of each character of the picture-based activation key with an alphabetic, numeric, or alphanumeric character may enable a lossless transition from an alphanumeric activation key to a picture-based activation keys. In particular, the number of possible key combinations for a 10-character picture-based activation key should be greater than or equal to the number of possible key combination for a 25-character alphanumeric activation key to achieve a lossless transition. For example, where a conventional alphanumeric activation key is case-insensitive, or only allows uppercase alphabetic characters, there are only 36 possible characters resulting in a 25-character activation key that allows for 36^25 possibilities. To achieve a lossless transition to a 10-character emoji-based activation key, there would need to be need 7776 possibilities for each Unicode emoji character. Although new Unicode emoji characters are being generated rapidly over time, and one day there may be 7776 or more Unicode emoji characters, there are currently fewer than 7776 Unicode emoji characters. Therefore, a lossless transition from a 25-character alphanumeric activation key to a 10-character emoji-based activation key may be accomplished by pairing each character of a 10-character emoji-based activation key with an alphabetic, numeric, or alphanumeric character.

Figure 3:
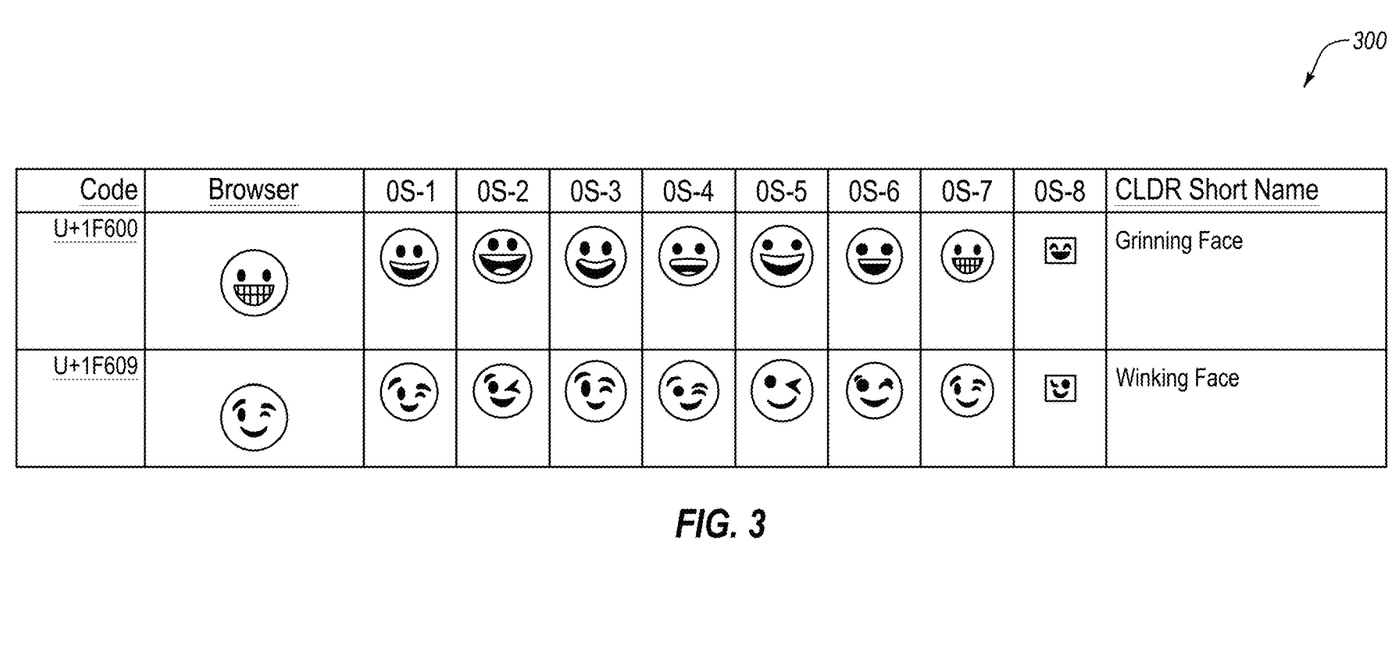
FIG. 3 illustrates operating system-specific renderings of Unicode emoji characters.

FIG. 3 illustrates a chart 300 showing operating system-specific renderings of Unicode emoji characters. There are currently several hundred Unicode emoji characters, each with its own distinct code and appearance. However, the rendering of each distinct Unicode emoji character may vary from one operating system to another. For example, as disclosed in FIG. 3, a particular Unicode emoji character with a distinct code of "U+1F600" and a CLDR Short Name of "Grinning Face" may be rendered differently depending on which operating system is rendering the Unicode emoji character. For example, the rendering of the "Grinning Face" Unicode emoji character is visibly distinct on each of the OS-1, OS-2, OS-3, OS-4, OS-5, OS-6, OS-7, and OS-8 operating systems.

For this reason, some embodiments of the software activation methods disclosed herein determine the operating system upon which a particular software application is being activated prior to sending an emoji-based activation key to a user so that the renderings of the emojis in the sent activation key will visibly match the renderings of corresponding Unicode emoji characters rendered by the operating system where the user is attempting to enter the emoji-based activation key into the software application. For example, some embodiments of the software activation methods disclosed herein may determine that the smartphone 204a of FIGS. 2A-2B is executing the iOS version 11.3 operating system, which may correspond to operating system OS-1 in the chart 300 of FIG. 3. Therefore, if an emoji-based activation key is sent to the user of the smartphone 204a, the emoji-based activation key may be sent with each character of the emoji-based activation key rendered to be specific to the iOS version 11.3 operating system.

Additionally or alternatively, some embodiments of the software activation methods disclosed herein may send an activation key as operating-system agnostic Unicode emoji character codes instead of sending actual renderings of Unicode emoji characters. Then, when the Unicode emoji characters are rendered based on the operating-system agnostic Unicode emoji character codes, the renderings of the Unicode emoji characters in the sent activation key will visibly match the renderings of corresponding Unicode emoji characters rendered by the operating system where the user is attempting to enter the emoji-based activation key into the software application. For example, some embodiments of the software activation methods disclosed herein may determine that the smartphone 204a of FIGS. 2A-2B is executing the iOS version 11.3 operating system, which may correspond to operating system OS-1 in the chart 300 of FIG. 3. Therefore, if an emoji-based activation key is sent to the user of the smartphone 204a, the emoji-based activation key may be sent with each character of the emoji-based activation key being in the form of an operating-system agnostic Unicode emoji character code, which will be properly rendered upon receipt to be specific to the iOS version 11.3 operating system.

Modifications, additions, or omissions may be made to the activation screen 211 without departing from the scope of the present disclosure. For example, in some embodiments, the activation screen 211 may include only the fields 215, or only the fields 215 with the fields 219, and may not include the fields 213. In these embodiments, the user may only have the option to enter a picture-based activation key, and may not have the option to instead enter a conventional alphanumeric activation key. Also, in some embodiments, picture-based characters other than Unicode emoji characters may be employed in the fields 215 of the activation screen 211, such as other standard or non-standard pictures. Further, in some embodiments, the activation screen 211 may be displayed on a display other than a touchscreen, such as on a monitor of a desktop or laptop computer. Also, in some embodiments, the activation screen 211 may be employed on an operating systems other than iOS version 11.3, such as a Windows, Linux, or Android operating system. Further, in some embodiments, the activation screen 211 may include additional components similar to the components illustrated in FIGS. 2A-2B that each may be configured similarly to the components illustrated in FIGS. 2A-2B.

FIG. 4 is a flowchart of an example method 400 for software activation using a picture-based activation key. The method 400 may be performed, in some embodiments, by a system or device or application, such as by the activation application 116 and/or the activation applications 112a-112n of FIG. 1 and/or the application 210 of FIG. 2. In these and other embodiments, the method 400 may be performed by one or more processors based on one or more computer-readable instructions stored on one or more non-transitory computer-readable media. The method 400 will now be described in connection with FIGS. 1, 2A-2B, 3, and 4.

The method 400 may include, at action 402, determining the operating system of the network device. For example, the activation application 116 may determine, at action 402, the operating system 108a executing on the network device 104a. In this example, where the network device 104a is the smartphone 204, the activation application 116 may determine that the operating system of the smartphone 204 is the iOS version 11.3 operating system, which corresponds to the operating system OS-1 in the chart 300.

The method 400 may include, at actions 404 and 406, sending and receiving renderings of the pictures of a picture-based activation key that are specific to the operating system of the network device. In some embodiments, paired alphabetic, numeric, or alphanumeric characters may also be sent and received along with the renderings of the Unicode emoji characters of the emoji-based activation key that are specific to the operating system of the network device. For example, the activation application 116 may send, at action 402, and the activation application 112a or another application on the network device 104a or on an another network device (e.g., an email application) may receive, at action 406, renderings of the pictures of the picture-based activation key that are specific to the operating system of the network device 104a. In this example, where the network device 104a is the smartphone 204, the activation application 116 may send renderings of the emojis of the emoji-based activation key that are specific to the iOS version 11.3 operating system of the smartphone 204, which corresponds to the operating system OS-1 in the chart 300, as well as paired numeric characters. In this example, these operating system-specific renderings in the emoji-based activation key will match the operating system-specific renderings of the emojis presented in the GUI virtual keyboard 217 that is presented on the touchscreen 206 of the smartphone 204.

The method 400 may include, at action 408, presenting a request for a user to enter a picture-based activation key in order to activate a software application on the network device. For example, the activation application 112a may present, at action 408, a request for a user to enter a picture-based activation key in order to activate the application 110a executing on the network device 104a. In this example, where the network device 104a is the smartphone 204, the activation application 112a may present the activation screen 211 of the application 210 which includes a request for a user to enter an emoji-based activation key in the fields 215 in order to activate the application 210 on the smartphone 204.

The method 400 may include, at action 410, receiving the picture-based activation key that includes pictures. In some embodiments, the picture-based activation key may include alphabetic, numeric, or alphanumeric characters in addition to the pictures of the picture-based activation key. In these embodiments, each of the pictures of the picture-based activation key may be paired with one of the alphabetic, numeric, or alphanumeric characters of the picture-based activation key. In some embodiments, the pictures of the picture-based activation key may be Unicode emoji characters. For example, the activation application 112a may receive, at action 410, the picture-based activation key that includes pictures. In this example, where the network device 104a is the smartphone 204, the activation application 112a may receive the emoji-based activation key that is entered into the fields 215 of the activation screen 211 by the user typing the emoji-based activation key on the GUI virtual keyboard 217 that is presented on the touchscreen 206 of the smartphone 204. Further, the activation application 112a may receive the paired numeric characters that are entered into the fields 219 of the activation screen 211 by the user typing the numeric characters on the GUI virtual keyboard 217 (e.g., by first tapping the "ABC" option to access the numeric keys of the GUI virtual keyboard 217).

The method 400 may include, at action 412, presenting the received picture-based activation key. For example, the activation application 112a may present, at action 412, the picture-based activation key. In this example, where the network device 104a is the smartphone 204, the activation application 112a may present the emoji-based activation key by displaying the emoji-based activation key in the fields 215 of the activation screen 211 during or after the user types the the emoji-based activation key on the GUI virtual keyboard 217.

The method 400 may include, at action 414, determining whether the received picture-based activation key is a valid picture-based activation key for the software application. If so (Yes at action 414), the method 400 may include, at action 416, activating the software application on the network device. If not (No at action 414), the method 400 may include, at action 418, denying activation of the software application on the network device. For example, the activation application 112a may determine, at action 414, whether the received picture-based activation key is a valid picture-based activation key for the software application. This determination may involve, for example, determining whether the received picture-based activation key matches any of the valid picture-based activation keys 114a stored at the network device 104a or any of the valid picture-based activation keys 118 stored at the activation server 106. Depending on whether the picture-based activation key is valid, the activation application 112a may either activate, at action 416, or deny activation of, at action 418, the application 110a on the network device 104a. In this example, where the network device 104a is the smartphone 204, the activation application 112a may either activate, at action 416, or deny activation of, at action 418, the application 210. Where the application 210 is activated, some or all of the features of the application 210 may become accessible to the user of the application 210. Where the application 210 is denied activation, some or all of the features of the application 210 may remain inaccessible to the user of the application 210 or become inaccessible (e.g. after a trial period) to the user of the application 210.

The method 400 may thus be employed, in some embodiments, to enable software activation using a picture-based activation key that includes pictures, such as Unicode emoji characters, instead of an alphanumeric activation key consisting entirely of alphanumeric characters. In some embodiments, the picture-based activation key of the method 400 may be shorter and/or easier for a user to enter (e.g., easier for the user to type) than a conventional activation key that consists entirely of 25 alphanumeric character. Therefore, the embodiments disclosed herein may enable a user to be more successful and less frustrated when entering an activation key.

Although the actions of the method 400 are illustrated in FIG. 4 as discrete actions, various actions may be divided into additional actions, combined into fewer actions, reordered, expanded, or eliminated, depending on the desired implementation. For example, in some embodiments, actions 410, 414 and 416 may be performed without performing the other actions of the method 400.

Further, it is understood that the method 400 may improve the functioning of a computer system itself. For example, the functioning of any of the network devices 104a-104n and the activation server 106 may itself be improved by the method 400. For example, the network device 104a may itself be improved by the method 400 enabling the application 110a to be activated using a picture-based activation key, which may results in a successful activation of the application 110a which may improve the functioning of the network device 104a.

Also, the method 400 may improve the technical field of software application activation. In particular, the method 400 may be performed to enable activation to be more successful and less frustrated to users.

FIG. 5 illustrates an example computer system 500 that may be employed in software activation using a picture-based activation key. In some embodiments, the computer system 500 may be part of any of the systems or devices described in this disclosure. For example, the computer system 500 may be part of any of the network devices 104a-104n and the activation server 106 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the method 400 of FIG. 4.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the method 400 of FIG. 5. These computer-executable instructions may be included, for example, in the operating system 510, such as the operating systems 108a-108n, in one or more applications, such as the applications 110a-110n, the activation applications 112a-112n, and/or the activation application 116, or in some combination thereof.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more of the actions of the method 400 of FIG. 4. In some embodiments, the application 514 may be part of the operating system 510 or may be part of an application of the computer system 500, or may be some combination thereof. In some embodiments, the application 514 may function as any one of the applications 110a-110n, the activation applications 112a-112n, and the activation application 116.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for software activation using a picture-based activation key, at least a portion of the method being performed by a network device comprising at least one processor, the method comprising:

presenting, on a display of the network device, a request for a user to enter a picture-based activation key, or a numeric and/or alphabetic character-based activation key as an alternative to the picture-based activation key, in order to activate a software application on the network device, a number of pictures in the requested picture-based activation key being less than a number of numeric and/or alphabetic characters in the requested numeric and/or alphabetic character-based activation key, the software application comprising program code in the form of computer-executable instructions configured to cause the network device to perform a certain operation or group of operations;

receiving, at the network device, the picture-based activation key that includes multiple pictures;

confirming, at the network device, that the received picture-based activation key is a valid picture-based activation key for the software application; and in response to confirming that the received picture-based activation key is a valid picture-based activation key for the software application, activating the software application on the network device.

2. The method of claim 1, further comprising:
receiving, at the network device, renderings of the pictures of the picture-based activation key that are specific to an operating system of the network device.

3. The method of claim 1, wherein:
the picture-based activation key includes numeric characters in addition to the pictures of the picture-based activation key; and
each of the pictures of the picture-based activation key is paired with one of the numeric characters of the picture-based activation key.

4. The method of claim 1, wherein:
the picture-based activation key includes alphabetic characters in addition to the pictures of the picture-based activation key; and
each of the pictures of the picture-based activation key is paired with one of the alphabetic characters of the picture-based activation key.

5. The method of claim 1, wherein the pictures of the picture-based activation key are Unicode emoji characters.

6. One or more non-transitory computer-readable media storing one or more instructions that, when executed, cause the one or more processors to execute the method of claim 1.

7. A computer-implemented method for software activation using an emoji-based activation key, at least a portion of the method being performed by a network device comprising one or more processors, the method comprising:

presenting, on a display of the network device, a request for a user to enter an emoji-based activation key, or a numeric and/or alphabetic character-based activation key as an alternative to the emoji-based activation key, in order to activate a software application on the network device, a number of emojis in the requested emoji-based activation key being less than a number of numeric and/or alphabetic characters in the requested numeric and/or alphabetic character-based activation key, the software application comprising program code in the form of computer-executable instructions configured to cause the network device to perform a certain operation or group of operations;

receiving, at the network device, the emoji-based activation key that includes multiple Unicode emoji characters;

confirming, at the network device, that the received emoji-based activation key is a valid emoji-based activation key for the software application; and in response to confirming that the received emoji-based activation key is a valid emoji-based activation key for the software application, activating the software application on the network device.

8. The method of claim 7, further comprising:
receiving, at the network device, renderings of the Unicode emoji characters of the emoji-based activation key that are specific to an operating system of the network device.

9. The method of claim 7, wherein:
the emoji-based activation key includes numeric characters in addition to the Unicode emoji characters of the emoji-based activation key; and
each of the Unicode emoji characters of the emoji-based activation key is paired with one of the numeric characters of the emoji-based activation key.

10. The method of claim 7, wherein:
the emoji-based activation key includes alphabetic characters in addition to the Unicode emoji characters of the emoji-based activation key; and
each of the Unicode emoji characters of the emoji-based activation key is paired with one of the alphabetic characters of the emoji-based activation key.

11. One or more non-transitory computer-readable media storing one or more instructions that, when executed, cause the one or more processors to execute the method of claim 7.

12. A computer-implemented method for software activation using an emoji-based activation key, at least a portion of the method being performed by a network device comprising one or more processors, the method comprising:
presenting, on a display of the network device, a request for a user to enter an emoji-based activation key, or a numeric and/or alphabetic character-based activation key as an alternative to the emoji-based activation key, in order to activate a software application on the network device, a number of emojis in the requested emoji-based activation key being less than a number of numeric and/or alphabetic characters in the requested numeric and/or alphabetic character-based activation key, the software application comprising program code in the form of computer-executable instructions configured to cause the network device to perform a certain operation or group of operations;
receiving, at the network device, the emoji-based activation key that includes multiple Unicode emoji characters each paired with an alphanumeric character;
confirming, at the network device, that the received emoji-based activation key is a valid emoji-based activation key for the software application; and
in response to confirming that the received emoji-based activation key is a valid emoji-based activation key for the software application, activating the software application on the network device.

13. The method of claim 12, further comprising:
receiving, at the network device, renderings of the Unicode emoji characters of the emoji-based activation key that are specific to an operating system of the network device.

14. The method of claim 13, further comprising:
determining the operating system of the network device.

15. The method of claim 13, wherein the paired alphanumeric characters are received, at the network device, along with the renderings of the Unicode emoji characters of the emoji-based activation key that are specific to the operating system of the network device.

16. One or more non-transitory computer-readable media storing one or more instructions that, when executed, cause the one or more processors to execute the method of claim 12.

17. The method of claim 2, further comprising:
determining the operating system of the network device.

18. The method of claim 8, further comprising:
determining the operating system of the network device.

* * * * *